June 14, 1966  E. L. KNOECHEL ETAL  3,255,716
MEASUREMENT OF FORCES WITHIN A TABLETING MACHINE
Filed Dec. 10, 1962  5 Sheets-Sheet 1

Direction of travel

INVENTORS
Edwin L. Knoechel
BY Harold E. Ross
Chester C. Sperry

Woodhams, Blanchard & Flynn
ATTORNEYS

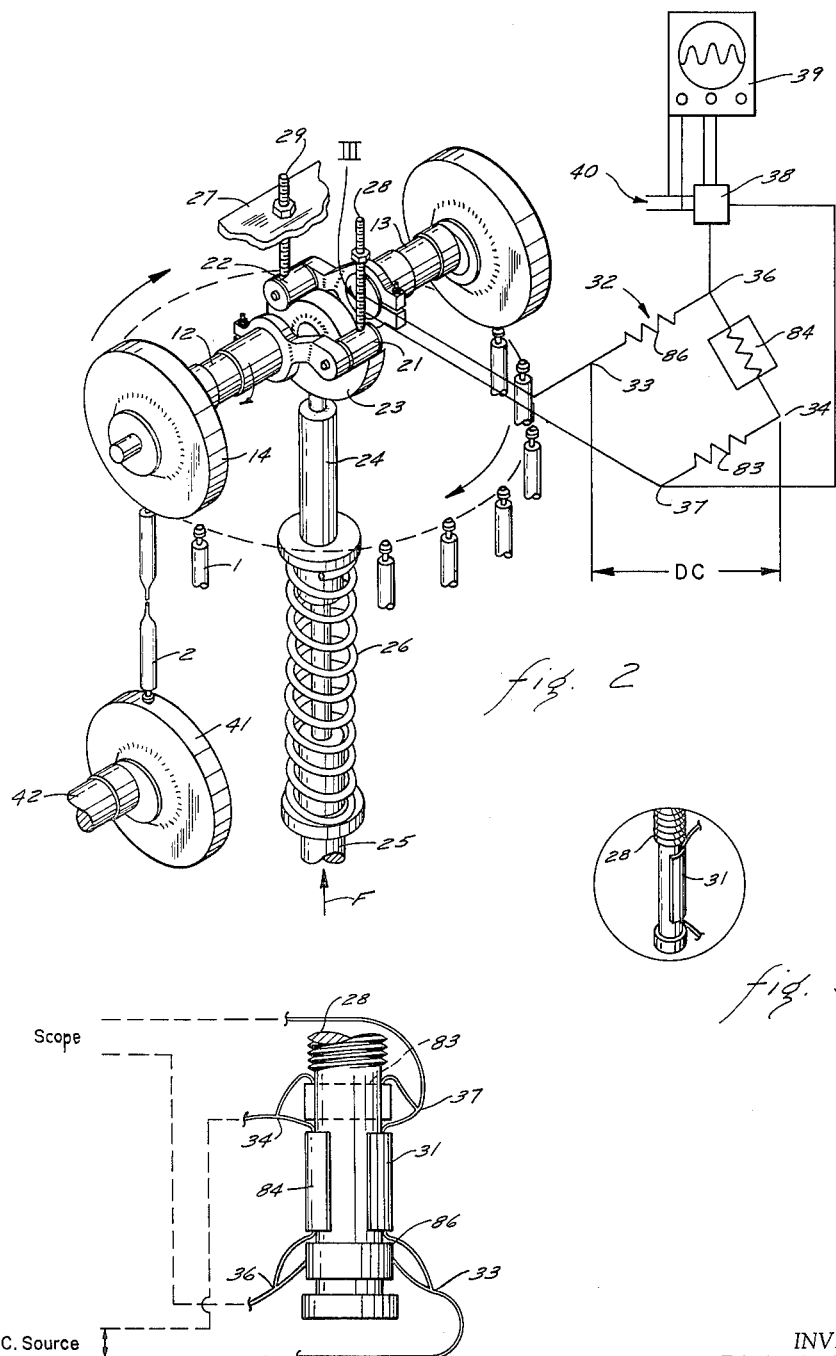

June 14, 1966    E. L. KNOECHEL ETAL    3,255,716
MEASUREMENT OF FORCES WITHIN A TABLETING MACHINE
Filed Dec. 10, 1962    5 Sheets-Sheet 3
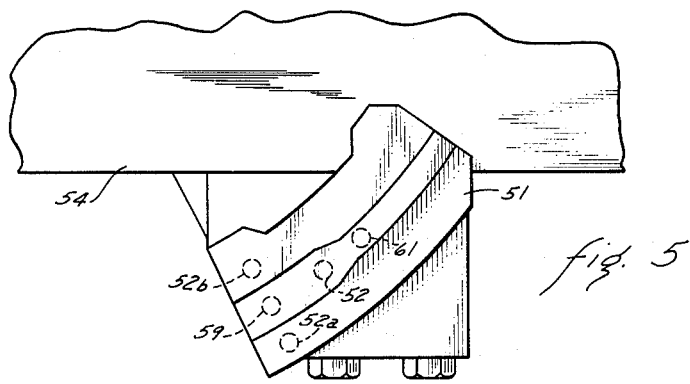
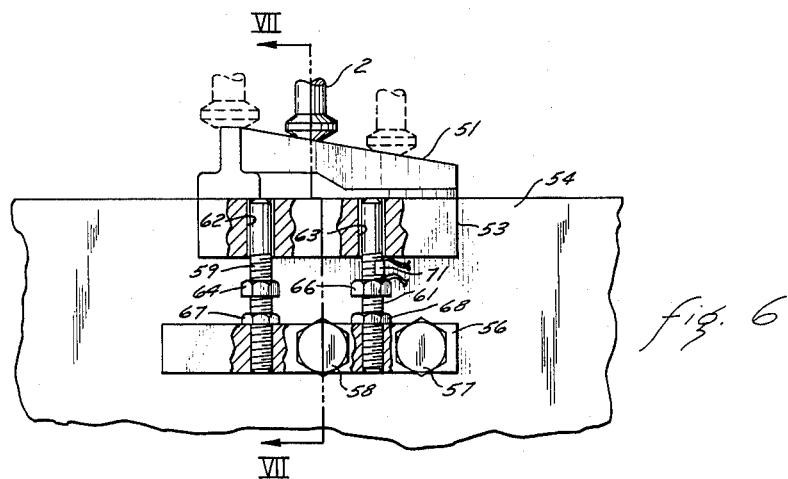
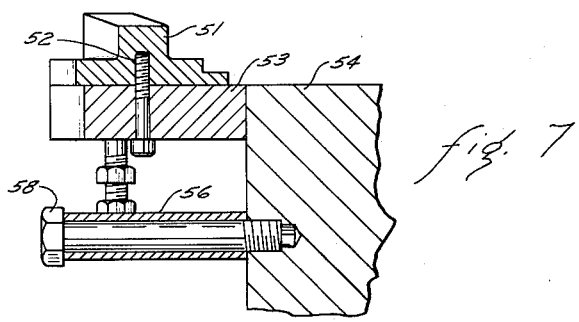
INVENTORS
Edwin L. Knoechel
Harold E. Ross
Chester C. Sperry
BY Woodhams Blanchard & Flynn
ATTORNEYS June 14, 1966  E. L. KNOECHEL ETAL  3,255,716
MEASUREMENT OF FORCES WITHIN A TABLETING MACHINE
Filed Dec. 10, 1962  5 Sheets-Sheet 4

INVENTORS
Edwin L. Knoechel
BY  Harold E. Ross
Chester C. Sperry

Woodhams Blanchard & Flynn
ATTORNEYS

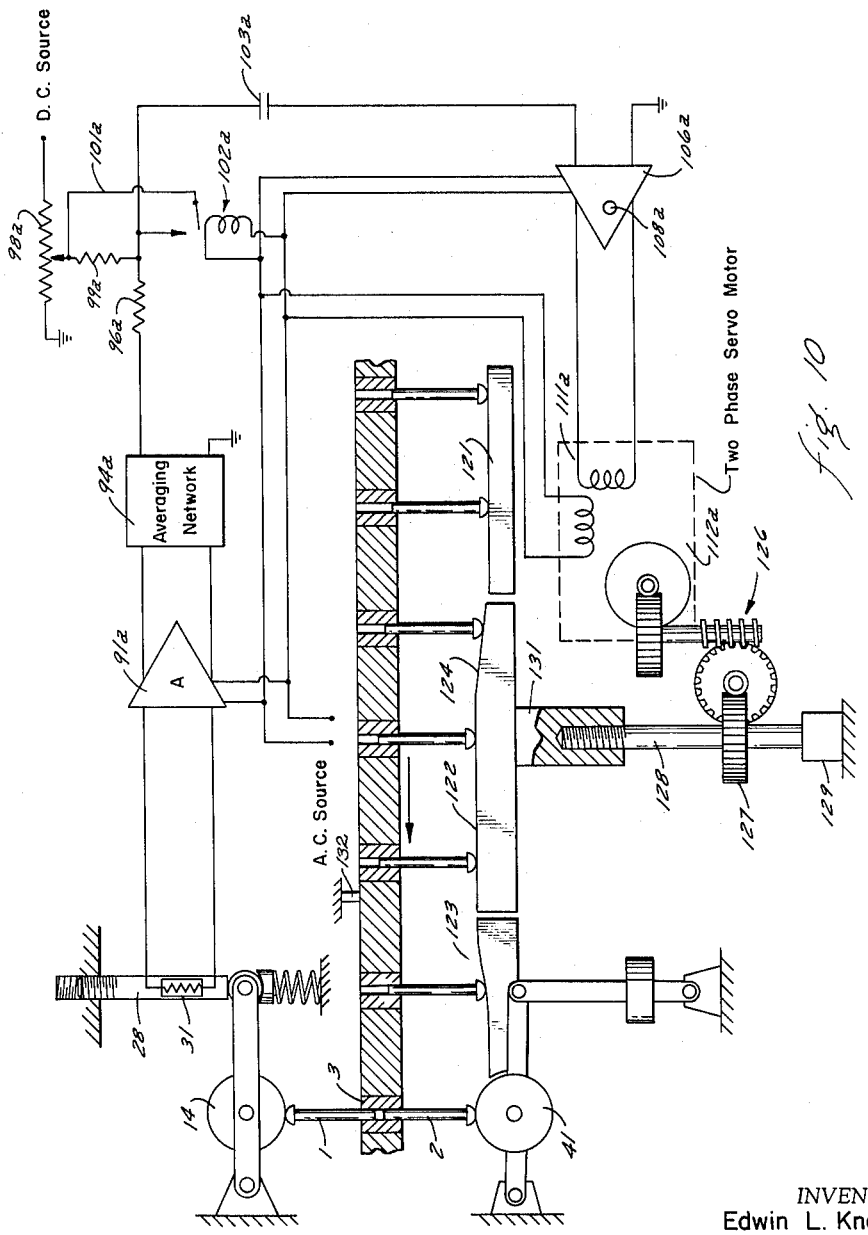

United States Patent Office 3,255,716
Patented June 14, 1966

3,255,716
MEASUREMENT OF FORCES WITHIN A
TABLETING MACHINE
Edwin L. Knoechel, Harold E. Ross, and Chester C.
Sperry, Kalamazoo, Mich., assignors to The Upjohn
Company, Kalamazoo, Mich., a corporation of Delaware
Filed Dec. 10, 1962, Ser. No. 243,338
17 Claims. (Cl. 107—17)

This invention relates to measuring and testing pressures in the pharmaceutical industry and it relates particularly to a method and apparatus for measuring either or both of the compression and ejection pressures applied to individual tablets in a multistation tableting machine and thereby obtaining a signal which may be used for such indicating, control or other purposes as may be desired.

The making of medicinal tablets by compression of powders, dry or treated, is an old art and satisfactory machinery for making such tablets has long been available. However, ever since such tablet-making procedures were first introduced, namely, some seventy-five years ago, relatively little work has been done in analyzing the forces applied to the powders during the forming of a tablet or the forces applied to the formed tablets to eject same from the dies in which they were compressed. Some work has been done in this connection with respect to single punch machines but insofar as we are aware very little, if any, carefully controlled investigatory work has been done toward analyzing and measuring the forces applied to the tablet material in a multistation machine.

It will be apparent, however, that an accurate measurement of such forces in a multistation machine will yield much useful data and, further, that if the signals from which such data are derived are of the proper nature they can be applied by feedback or other known techniques to effect various kinds of control of a tableting machine.

For example, with respect to data derivation, data relating to the individual stations of a machine will show whether tablets made by such machine are being compressed equally and, accordingly, whether they are of uniform physical characteristics. Data relating to the pattern by which force is applied to a tablet may yield design suggestions for improving the power efficiency of the tableting machines. Data relating to the ejection force required to eject tablets from the forming dies may yield suggestions for design improvements to reduce still further the power required by a machine, to reduce machine wear and more especially punch and die wear, to eliminate or reduce ejection difficulties, to reduce dusting of tablets, to reduce breakage, capping, splitting or chipping of tablets and in other ways both to improve the mechanics of the tableting operation and to improve the final product.

Alternatively or additionally, the outputs of one or more of appropriate sensing devices may be connected to suitable control means, such as speed, pressure, feed or other operation controls as desired for controlling the operation of the machine and thereby improve both the quality of the product and/or the efficiency of the machine.

A further problem has long existed in multistation tablet-making machines, in that a malfunction may develop in connection with a given tablet-forming station which will result in improperly pressed tablets. Inasmuch as the discharge from a multistation tablet machine is usually of a continuous and rapid nature, it is difficult to identify which tablet-forming station is causing trouble, particularly where the imperfection is not readily identifiable visually. In fact, in some cases imperfections may exist in such tablets, due for example to insufficient compression thereof or excesive ejection pressure because of binding of the tablet in the die, for a long period of machine operation before the existence of such imperfection is known to the operator. When finally the existence of the imperfection is discovered, the tablet-forming station or stations at fault must still be found. Thus, the availability of a method and means for continuous monitoring of a tablet-forming machine, which monitoring includes a continuous presentation of forces developed in both the tablet-forming and tablet-ejection mechanism of each tablet-forming station, will be of value in improving the quality of the product and alerting the operator promptly with respect to a malfunctioning of any individual portion thereof. Where it is not desired to have continuous monitoring of all of a group of machines, selective monitoring of individual ones thereof from time to time may be obtained by providing permanently installed sensing devices in a variety of places on the desired machines which sensing devices are then connectible from time to time as desired to an indicating device, such as an oscilloscope, which may be moved from one machine to another, or from one sensing device to another on the same machine, as desired.

Accordingly, the objects of the invention include:

(1) To provide a method and means applicable to a multistation tablet-making machine for measuring the forces applied to or appearing in, individual tablets in a tablet-forming operation.

(2) To provide a method and means, as aforesaid, for measuring the pressures applied to the individual tablets in ejecting them from the respective forming dies.

(3) To provide a method and means, as aforesaid, which will give individual readings identifiable with respect to each station of a multistation machine wherein the forces developed on the tablet in each station, in either or both of tablet-forming or tablet-ejecting operations, can be determined both quantitatively with respect to each forming die and comparatively of the stations with respect to each other.

(4) To provide a method and means, as aforesaid, which will also show the pattern of force appearing on each of the individual tablets, again both quantitatively with respect to each tablet and comparatively of the tablets with respect to each other.

(5) To provide a method and means, as aforesaid, applicable to existing machines and applicable from the outside of said machines whereby the measuring equipment may be applied to an existing machine without appreciable, if any, modification thereof.

(6) To provide a method and means, as aforesaid, which will produce signals of such a nature that they can be used as desired with either or both of information indicating means, such as an oscilloscope, or with operation-controlling means, such as feedback means for regulating the pressures developed within, and/or the amount of material fed to, the tablet dies.

(7) To provide a method and means, as aforesaid, which can be carried out to at least a large extent with standard parts and equipment.

(8) To provide a method and means, as aforesaid, which can be carried out without interfering with the normal operation of a multistation tablet-forming machine.

(9) To provide a method and means, as aforesaid, which will be operable upon a continuous basis and may therefore be effective for monitoring or for continuous control purposes.

(10) To provide a method and means, as aforesaid, wherein the signal-sensing devices are relatively simple and inexpensive and may accordingly be mounted freely and permanently in a variety of places on a plurality of machines and wherein the signal-indicating device, such as an oscilloscope, may then be either physically moved as desired from one machine to another and connected to the signal-sensing devices for use as desired or by using a control and switching panel the signal-indicating device may be merely switched from one machine to another.

(11) To provide a method and means, as aforesaid, which excepting for the indicating and/or control devices will be relatively inexpensive and which will yet be highly versatile both with respect to a given machine and with respect to machines of a wide variety of types and makes.

Other objects of the invention will be apparent to persons acquanited with apparatus of this general type upon a reading of the following specification and an inspection of the accompanying drawings.

In the drawings:

FIGURE 2 represents an oblique schematic view of certain operating portions of the machine shown in FIGURE 1 with apparatus for practicing the invention applied thereto.

FIGURE 3 is a detail showing condition-sensing means applied to a selected portion of the machine shown in FIGURES 1 and 2.

FIGURE 4 is a detail similar to FIGURE 3 showing a modified method of applying condition-sensing means to the machine for the obtaining of greater accuracy.

FIGURE 5 is a fragmentary view taken from the top of the means showing the inclined track which raises the lower punch to eject the tablet.

FIGURE 6 is a side, partially broken, view of the fragment shown in FIGURE 5.

FIGURE 7 is a section on the line VII—VII of FIGURE 6.

FIGURE 10 is a schematic view similar to FIGURE 9 and showing a modification.

*General description*

Briefly, the method of the invention consists of (a) measuring the successive very small mechanical movements to which a selected, accessible and substantially stationary portion of a tablet-making machine is subjected by the forces developed within the machine at a selected point during the making and/or ejection of successive tablets, such portion of the machine being so selected that each such movement will be proportional to the forces imposed upon the tablet, (b) converting said successive movements into a suitable measurable equivalent and then (c) indicating such measurable equivalent on suitably responsive indicating means, such as an oscilloscope if said equivalent is an electrical equivalent and/or utilizing said measurable equivalent for control purposes, such as to adjust the pressure developed within the dies of the tablet-making machine or the amount of tablet material supplied to such dies.

Said method is in at least one specific embodiment conveniently practiced by fastening an electrical impedance element, as a resistance, to suitable force reaction means on the tablet-making machine, connecting same in such a manner that successive strains appearing in said reaction means will impose proportional successive strains in said resistance element whereby to successively alter the resistance thereof. Said resistance element is then connected suitably, as by a Wheatstone bridge arrangement, to a power source and to indicating means whereby changes in the resistance of said resistance element provide signals which will appear on the screen of the oscilloscope and/or may be conducted to means effecting said control purposes.

*Detailed description*

In turning now to a detailed description of the method and apparatus comprising the invention, it is believed that the method thereof may be more readily understood if it is described in connection with certain selected specific means for practicing same. Accordingly, the description will proceed first to discussion of such specific means with the understanding, however, that such represents in no sense the only apparatus for carrying out the invention but is instead adopted solely for convenience in discussion. Other devices will be immediately apparent by which the invention may be practiced and the method aspects of the invention should be understood accordingly.

Figure 1:
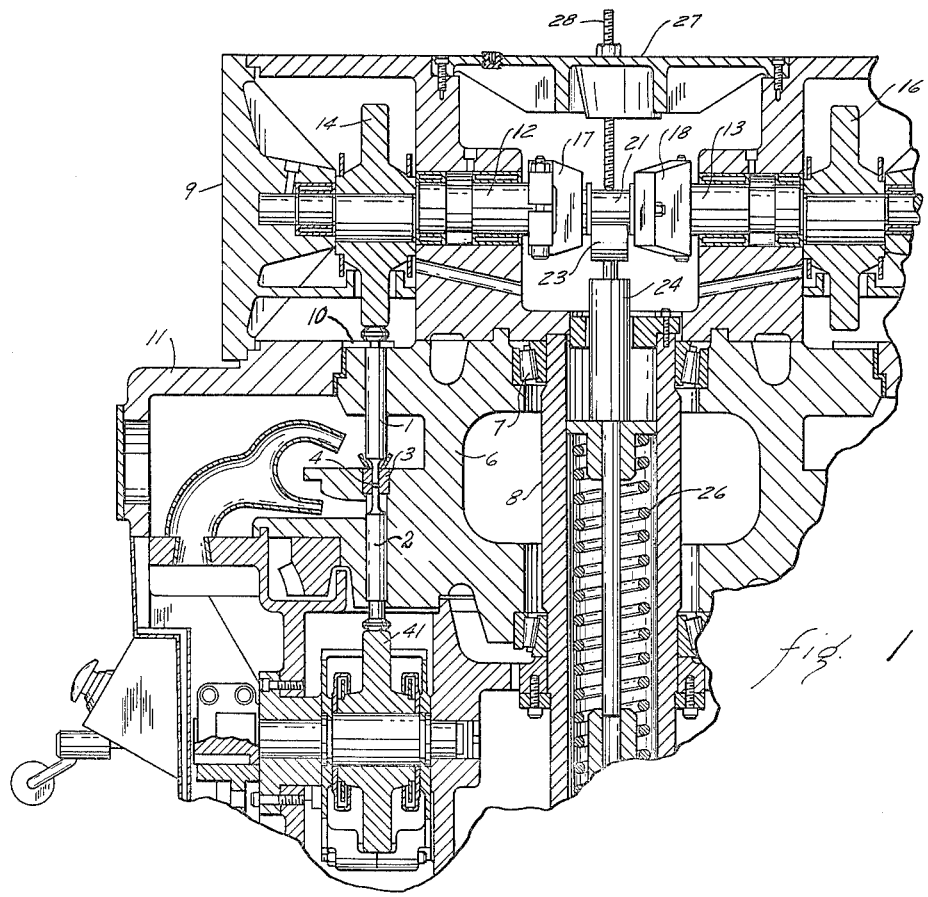
FIGURE 1 represents a fragmentary view in central section of one standard tablet-making machine of the type to which the invention is applicable.

Referring first to FIGURE 1, there is shown first fragmentarily a cross section of a typical multistation tablet-making machine in connection with which the invention may be carried out.

In this machine an upper punch 1 and a lower punch 2 cooperate with a die 3 to form a tablet 4 in a suitable and known manner. More specifically, with the upper punch 1 in a raised position, and the lower punch 2 in the position shown in FIGURE 1, suitable material to be tableted, such as medicinal powder or granules, is poured into the opening within the die 3 above the lower punch 2 after which the upper punch is brought down and the lower punch up to exert a pressure onto said powder and compress it into a tablet. The upper punch then retracts and the lower punch moves upwardly against the tablet to drive same out of the die 3 to be picked off and transferred to suitable collecting means (not shown) by which the tablet is removed from the tablet-making machine. Normally, as is well understood, a typical multistation tablet-making machine will have as many, as thirty-five of such combinations of upper and lower punches and dies cooperating with each other in the same manner as above described for parts 1, 2 and 3.

Both the upper and lower punches 1 and 2, respectively, and the die 3 (FIGURE 1), together with their several counterparts around the remainder of the machine, are mounted upon a rotary table 6 which is mounted by bearings of which one is shown at 7, onto a central hollow post 8. Said rotary table is then caused to rotate past suitable means for feeding the powder successively into the respective dies and also past means for removing the finished tablets following their ejection from the respective dies.

A non-rotating housing 9 is positioned immediately above the table 6 and is mounted upon the frame 11 of the machine. Within said housing 9 are rotatably mounted radially arranged shafts 12 and 13, said shafts carrying punch operating, rotatably mounted, upper pressure rolls 14 and 16 which pressure rolls are eccentrically mounted on the respective outer ends of shafts 12 and 13. Said shafts 12 and 13 carry cranks 17 and 18 on their respective inner ends, the throw ends of which cranks carry rollers 21 and 22 (FIGURE 2), respectively, thereon, which rollers in turn rest upon a crosshead 23. With the center of said pressure roll 14 being laterally offset from the axis of said shaft 12, the pressure roll 14, shaft 12 and roller 21 together comprise a rocker system. The pressure roll 16, shaft 13 and roller 22 do likewise. Said crosshead is supported upon a plunger 24 which is received within the hollow post 8 (FIGURE 1) and is urged upwardly with a predetermined force by means of the spring 26, which in turn is urged upwardly by an suitable upward force as indicated by the arrow F in FIGURE 2, usually applied by a pressure fluid, appearing on the rod 25. For example, the rod 25 may be connected to a piston within a fluid pressure cylinder as disclosed in U.S. Patent No. 2,846,723. Compression thus applied to the spring is transmitted through the plunger 24 and crosshead 23 and acts through the rollers 21 and 22 onto the cranks 17 and 18 and tends to turn the shafts 12 and 13. However, there are mounted in the upper plate 27 of the housing 9 a pair of screws 28 and 29 (FIGURE 2) which are adjustable with respect thereto and are arranged to bear against the rollers 21 and 22. Thus, in the inactive condition of the machine, the compression of the spring 26 is entirely absorbed by the screws 28 and 29.

During the compression operation the lower punches 2 engage lower pressure rollers, one of which is shown at 41 in FIGURE 2, the lower pressure rollers being radially aligned with the upper pressure rollers so that compression force is simultaneously applied to the upper and lower surfaces of the tablet. The lower pressure roller is connected to a crank 42 so that the position of the lower punch 2 within the die 3 during the compression operation can be adjusted in any suitable manner.

However, adjustment of the screws 28 and 29 upwardly or downwardly will bring about a rotation of the shafts 12 and 13 and, because of the eccentric mounting of the pressure rolls 14 and 16, effect a movement of said pressure rolls upwardly or downwardly. Thus, insofar as the upper punches are concerned, rotation of the table 6 will bring said upper punches alternately under the pressure rolls 14 and 16 and effect downward movement of such punches. In the event that foreign, non-compressible material should occupy the die 3, or in the event that an excessive amount of material is in said die, due to a failure to eject the previous charge of material, then the resulting pressure acting through an appropriate one of the pressure rolls 14 and 16 will cause a rotation of one of the shafts 12 and 13 which rotation, due to the rocker relationship above mentioned, is permitted but resiliently opposed by the plunger 24 and the spring 26 associated therewith. Thus, the upper punches are urged downwardly with the desired force but resistance to said downward urging above a predetermined value will cause yielding of the spring 26 and thereby avoids damaging either the punches, the dies or other machine members.

Turning now to one preferred manner of applying signal pickup means to the machine here described, it will be recognized that the screws 28 and 29 are normally subjected to a substantial compressive stress which is steady when the machine is inactive but which diminishes each time that compressive pressure appears against the upper punch and tends in view thereof to cause rotation of the respectively associated shafts 12 and 13. For example, referring to FIGURE 2, clockwise rotation of the shaft 12 will urge the roller 21 downwardly against the spring 26 and thereby diminish the compressing force applied to the screw 28.

To provide a stress-sensitive means, there is applied to one of said screws 28 and 29, here the screw 28, a suitable electrical impedance element, in this embodiment a resistance 31, said resistance means being firmly cemented to the screw 28, or otherwise mounted thereto in a known manner, as described at length in the "Strain Gauge Primer," by Perry and Lissner, McGraw-Hill Book Company, Inc. (1955). While any of many known types of resistances, the same all being readily available and well-known shelf items, may be used for the resistance means 31, a semiconductor type thereof is preferable due to the much higher gauge factor available therefrom as compared to earlier known resistance materials.

Said resistance 31 is then connected to a suitable means for indicating changes in resistance thereof in response to changes in the internal stress conditions thereof. One preferred means is to connect said resistance 31 into a Wheatstone bridge circuit 32, having suitable resistances connected therein, suitable potential, usually about 6 volts D.C., being applied to the input terminals 33 and 34 of said bridge circuit and the output terminals 36 and 37 thereof being connected to an amplifier 38 which in turn is connected to the vertical deflection terminals of an oscilloscope 39. The power supply conductors 40 are connectible to any suitable source of appropriate power, usually an A.C. source, for energizing both the amplifier 38 and the oscilloscope 39.

The ejection means may likewise be subjected to similar measurement. Here the lower punches indicated at 2 are, at the ejection station, caused to move upwardly by any of a variety of devices. One typical device is shown in FIGURES 5, 6 and 7 wherein a cam 51 is rigidly fixed by suitable means such as screws, of which one appears at 52 and the location of others is indicated at 52a and 52b, to a flange 53 extending sidewardly from the frame 54 of the machine. Movement of said lower punch 2 in a leftward direction as appearing in FIGURES 5 and 6 will move same upwardly to effect the ejection operation desired. This portion of the apparatus is standard and already well known.

To provide the desired measurment facilities, a block 56 is rigidly fastened by screws 57 and 58 into the frame 54 of the machine at a point a short distance below the flange 53. A plurality, here two, of screws 59 and 61 are threadedly affixed into the block 56 and extend upwardly through suitable openings 62 and 63, respectively, in the flange 53 and bear against the lower side of the cam member 51. Suitable means, such as nuts 64 and 66, are provided rigidly with respect to said screws 59 and 61 for the purpose of effecting rotation of said screws. The nuts 67 and 68 are jamb nuts for holding said screws in position after adjustment thereof.

Said screws 59 and 61 are screwed upwardly sufficiently to move the cam 51 a slight distance upwardly away from the flange 53 and against the holding force of the screws 52, 52b and 52c whereby to cause a substantial compressive stress to appear within said screws 59 and 61. Each time the lower punch 2 moves across said cam 51 the stress appearing within said screws 59 and 61 will be increased by an amount proportional to the force exerted by said punch as it drives the tablet out of the die 3.

A stress-sensitive device, here a resistance 71, is affixed to one or both of said screws, such as the screw 61, and is connected into suitable resistance-sensing and indicating means, such as a Wheatstone bridge and oscilloscope system similar to, or the same as, that above described in connection with the resistance 31. However, in this case the stress appearing in the screw 61 is the sum of the stresses normally appearing therein and that added thereto by the action of a lower punch 2 against the cam 51. Contrastingly, the action of the upper punch against the pressure roll 14 subtracts stress from the screw 28. However, the stress-sensitive units 31 or 71 involved with each thereof are capable of registering a change in stress in either direction and accordingly the signal will still be made as desired and will appear on the oscilloscope used therewith.

*Operation*

Turning now to the operation of the particular system above described, it will be recognized that the screw 28 is normally under substantial compressive force. This will act through the bonding between the screw 28 and the electrical resistance element 31 to shorten same by an amount proportional to the compressive strain of the bolt or screw 28. When an upper punch comes against one of the pressure rolls, such as the pressure roll 14, this acts through the crank 17 to urge the crosshead 23 downwardly against the spring 26. This diminishes the stress within the screw 28 by an amount proportional to the force applied to the upper punch 1. The change in stress appearing at this moment in the screw 28 is reflected in a change in the resistance of the stress-sensitive unit 31 and this then is reflected through the Wheatstone bridge system and appears on the screen of the oscilloscope 39.

Since the several ones of the upper punches appear at points spaced in time from each other in their contact with the pressure roll 14, the changes in stress appearing within the screw 28 and sensed by the stress-sensitive unit 31 will appear on the oscilloscope at points spaced in time from each other and hence by suitable adjustment of the oscilloscope it becomes possible either to study the forces applied to the tablet at any given station, any adjacent group of stations, or all of them as desired. This makes it possible to compare both the total magnitude of force applied to the several tablets at any one station with the corresponding forces applied to the tablets at all or any of the remaining stations and by sufficiently expanding the indication on the oscilloscope screen corresponding to the forces applied at any one of said stations, the pattern of development of force at such station may be studied in considerable detail, photographs may be taken thereof and other conventional force analysis and oscilloscope-utilizing techniques may be followed.

After a tablet has been formed in a given station, the upper punch of such station is raised by moving up a rising portion of the cam 10 and is no longer active with respect to such tablet. The rotatable table 6 continues its movement and the lower punch of the given station presently contacts the cam 51 by which it is forced upwardly to eject the newly formed tablet from the die 3. As the lower punch bears against said cam, it applies a reaction force thereagainst urging said cam toward the supporting flange 53. This in effect urges said cam in the same direction as that in which it is drawn by the fastening screws 52, 52a and 52b and thereby causes additional compressive stress to be applied to the screws 61 and 59. Where the lower punches are spaced widely enough apart so that only one punch at a time bears against the ejection cam 51, the additional compressive stress appearing in the screws 61 and 59 is a direct function of the ejection force being applied to the given tablet. However, where several of said lower punches contact the ejection cam 51 simultaneously, as is often the case with the usual commercial machine, then there will be an overlapping in the force patterns appearing on successive punches and the stress appearing in the screws 59 and 61 will be a summation of the forces appearing in the lower punches in contact at any given time with said ejection cam 51. However, since the peak forces appearing on each lower punch will occur at a separate time from the peak forces appearing on adjacent punches, the same will appear correspondingly in the screws 59 and 61 and hence at least the peak forces will be separately identifiable even under these last-named circumstances.

Thus, the forces applied to the tablet in the compression operation will be converted into a proportionate electrical signal appearing at the terminals of the stress-sensitive unit 31 and the forces applied to the lower surface of the tablet in the ejection operation or at least the peak thereof will appear as a proportionate signal at the terminals of the stress-sensitive unit 71. The electrical signals from the terminals of these two units may be respectively indicated on separate oscilloscopes or they may be indicated on the same screen of a dual-beam oscilloscope. It will be noted, however, that since the appearance of a force onto the lower punch of a given pair caused by an ejection operation thereof will follow by a substantial period of time the appearance of force onto the said given pair of punches caused by a compression operation thereof, the trace on a dual-beam oscilloscope screen corresponding to the ejection operation of the lower punch of a given pair will appear substantially offset in a following direction from the trace corresponding to the compression operation of said pair. Thus, in FIGURE 8, which is an actual reproduction of the traces obtained from a dual-beam oscilloscope by the method and means above described, the peak 81 corresponds to the compression operation of the selected pair whereas the peak 82 corresponds to the lower punch of the same pair effecting the ejection of the same tablet.

Figure 8:
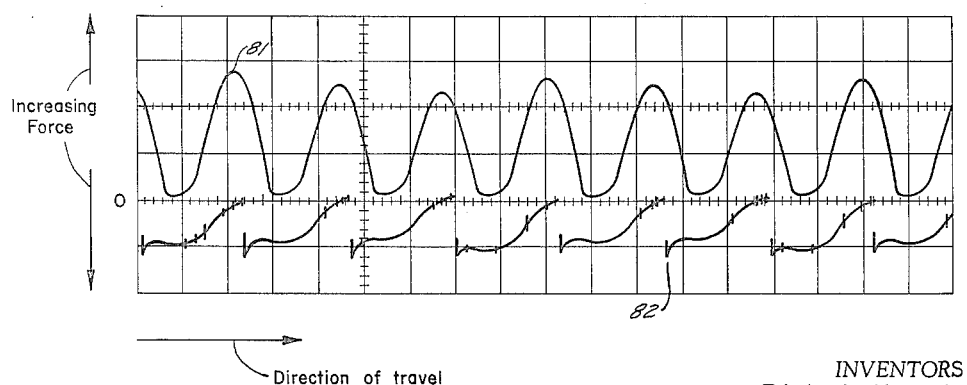
FIGURE 8 shows a typical reading appearing on the screen of a signal-sensing oscilloscope and showing both readings for the tablet-forming punches and readings for the tablet-ejecting means in a typical multistation tablet-forming machine.

It should be noted, however, that the vertical sweep sensitivity of the beam providing the upper trace appearing in FIGURE 8 was considerably less than that of the beam providing the lower trace for convenience in utilizing the simultaneous appearance of said traces on said screen. Actually the magnitude of forces applied to the tablet in the compression operation is much greater than the force applied to the tablet in the ejection operation, often as much as 10 to 100 times as much. This constitutes, therefore, a further illustration of the versatility of this method and apparatus and illustrates further the ease with which it may be adapted to meet specific circumstances and requirements.

Further, by reference to FIGURE 8, it will be apparent that the method and apparatus of the invention will show a very exact representation of not only the maximum forces appearing on the tablet in either the compression or ejection operations at a given station but will also show the rate, manner and pattern in which such forces develop and likewise show the rate, manner and pattern in which such forces decay.

*Modifications*

While the above description has assumed that only a single electrical resistance unit would be used in a given stressed location, it is entirely possible within the scope of the present invention to use a plurality of resistance units in such location. For example, as shown in FIGURE 4 in connection with the screw 28, the resistance 84 on the opposite side of the bridge circuit is applied to the opposite side of the screw 28 in order to equalize any possible inaccuracies due to lateral deflection of said screw as distinguished from pure compressive strain. Further, in this arrangement, the resistances 83 and 86 are applied to the screw 28 in order that they will be under the same temperature conditions as applied to the resistances 31 and 84 but they are placed thereon in an alignment transverse to the direction of stress therein in order than they will not be affected by stress appearing in the screw 28. That is, resistances 31 and 84 are mounted on the screw 28 so that they extend in the direction in which the stress is applied whereby their resistance changes in proportion to the changes in the stress in said screw. Resistances 83 and 86 are positioned at right angles to the direction of the applied stress so that changes of the stress do not affect them appreciably. Thus, the accuracy of the measurement is still further enhanced.

The same technique may be applied to the screws 61 and 59.

It will be recognized also that the point at which the resistance elements are applied to a given machine may be widely varied provided only they are applied to a single element which receives repeated stresses as the several tablet-handling punches are individually actuated in performing the operation which is to be studied. Thus, by receiving appropriate stress signals and feeding them to a suitable time and voltage sensitive instrument, such as an oscilloscope, signals are obtained which are appropriately spaced in time to represent on the same screen a plurality of successively appearing signals. Suitable permanent records, such as magnetic tape or pen recordings of the impulses or by photographs of the oscilloscope screen, may be made if desired. In this manner it becomes possible to analyze and compare successively occurring stress conditions from a single stress-sensitive device and on a single signal portraying device.

Likewise, while only a few specific embodiments have been shown by which the stress condition may be sensed, and by which the stress condition can be converted into a signal variable in magnitude according to the stress condition, there will be a variety of other devices and circuits which can be used in place of the specific circuitry above set forth for receiving the signal from the stress-sensitive device and supplying it to signal responsive means, which means may be an indicator as shown in FIGURE 2, other signal utilizing means such as a control device as hereinafter set forth, or any other means by which a signal proportional to the forces appearing on the tablet may yield useful information or perform a useful function.

Figure 9:
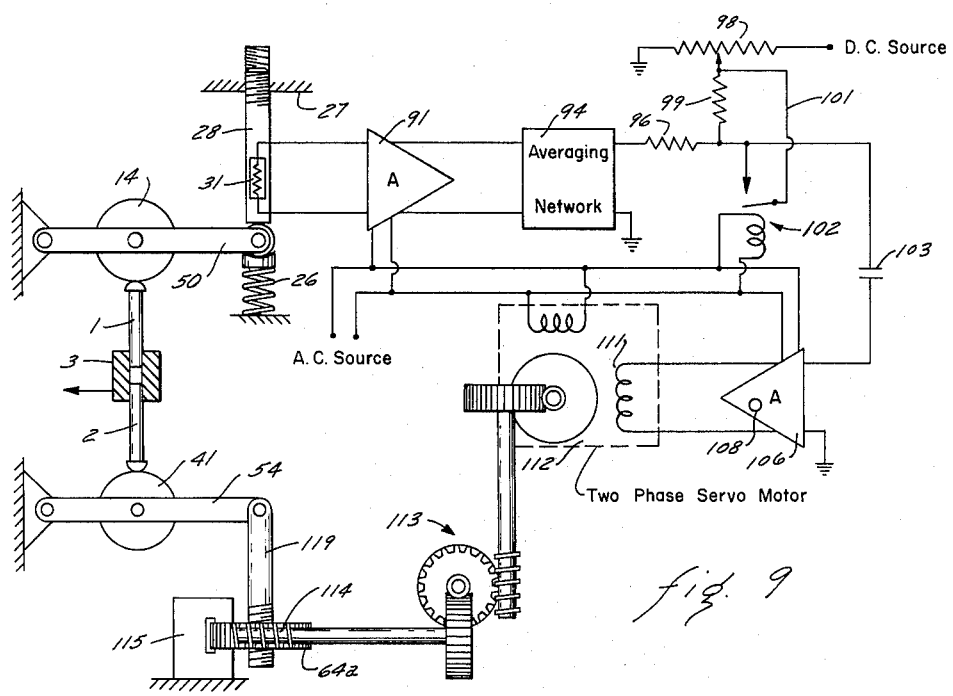
FIGURE 9 represents a schematic view of certain operating portions of the machine shown in FIGURE 1, with apparatus enabling the sensing means of the invention to control said machine.

For example, the signal from the stress-sensitive unit may be supplied to a control device rather than to, or in addition to, a signal indicating device. FIGURE 9 schematically discloses, for purposes of illustration only and not to be taken as limiting, a device whereby the output of the stress-sensitive unit 31 may be used to control the pressure applied by the punches 1 and 2 to material within the die 3.

As before, movement of the die 3 and punches 1 and 2 in the direction indicated by the arrow brings the upper punch against the upper pressure roller 14 and the lower punch against the lower pressure roller 41. The upper pressure roller 14 is mounted on a stationary bracket and said pressure roller is connected by an arm 50 to the bolt 28 so that movement of said pressure roller in a vertical direction acts mechanically to change the stress in bolt 28. This in turn affects the stress-sensitive unit 31 which is mounted on said bolt. The output of the stress-sensitive unit 31 is fed through a D.C. amplifier 91 (FIGURE 9.) to an averaging network 94. The average D.C. voltage thus obtained is fed through a resistor 96 and compared to a reference D.C. voltage obtained through the resistor 99 and potentiometer 98 from a D.C. power supply not shown. The difference between the average voltage and the reference voltage may be either in a plus direction or in a minus direction. The difference D.C. voltage is converted to pulsed D.C. voltage in any conventional manner, such as by means of the chopper 102, and said pulsed D.C. voltage is fed through a condenser 103, which changes the pulsating D.C. voltage to an A.C. voltage, to an A.C. amplifier 106. The output of the A.C. amplifier 106 is fed through the phase coil 111 of a two-phase servo motor 112, thereby controlling one phase of said servo motor.

The second phase of said servo motor is fed from a suitable A.C. source which source may also be used to power the amplifiers 91 and 106 and the chopper 102. The output of said servo motor, through suitable translating means, such as the gear train generally indicated at 113 including the worm 114, effects rotation of an adjusting nut 64a which threadedly engages with the screw 119. Said nut is here shown to be held against vertical movement by a fixed slotted block 115. Therefore, rotation of the adjusting nut 64a causes axial movement of the screw 119 which adjusts the roller 41 toward or away from the die 3 thereby causing the pressure exerted by the punches 1 and 2 on the material located within the die 3 to be altered.

It will be noted that the control system hereinabove described does not control the individual pressure of each individual punch but rather controls the average pressure of the several punches in a multipunch machine. This is derived partly from the averaging device 94 and partly from making the response of the control device here shown slow enough so that the changes in the punch pressure made by said device are a function only of the average punch pressure of at least several of the punches in the machine. This avoids the wear inherent in too frequent adjustments of said punch pressure and insures that the desired average punch pressure for the entire machine will be maintained. It is also desirable to make the control system response slow because otherwise punch pressures encountered when starting or stopping the machine might be outside the desired pressure range. A control switch 108 is provided to turn off the control device when the machine is shut down.

However, there may be instances where a more rapid feedback and response is desired and this, in a manner readily derivable from the foregoing, may be supplied as desired to control the individual punch pressure of the individual punches. Such involves elimination of the average network 94. It is also contemplated that the upper punch or both punches can, if desired, be controlled by a control device such as the one hereinabove discussed. Such involves mounting the screw 28 in the same fashion as screw 119 and adjusting its position in the same way.

It will also be recognized that the output of the stress-sensitive unit 31 can be used for various other purposes in order to control certain characteristics, as the weight, of the tablets produced by the machine. For example, it has been discovered that the average compaction pressure is a straight-line function of the weight of material placed in the die at the usual pressures involved in forming pharmaceutical tablets. Thus, the feedback signal can be used for adjusting the amount of material placed in the dies 3 in order to achieved compaction pressures within the desired range and thus, in turn, to control the uniformity of die fill, i.e., the tablet weight. FIGURE 10 shows one suitable arrangement for this purpose.

In this embodiment, the lower punches 2 travel successively along a rail 121, a cam 122 and a rail 123 before they contact the lower pressure roller 41. The rail 121 is stationary and supports the lower punches at the bottom of the die. The cam 122 is vertically adjustable and it has a sloped portion 124 for raising the punches within the die in order to control the volume of material which can be held in the dies 3. The rail 123 is fixed with respect to the lower pressure roller 41 and serves to guide the punches as they travel from the vertically adjustable cam 122 to said lower pressure roller.

The output signal from the stress-sensitive unit 31 is supplied to a feedback circuit which is here shown as being identical with the feedback circuit disclosed in FIGURE 9 and it needs no further description. The elements of the feedback circuit in FIGURE 10 have the same reference characters as their counterparts in FIGURE 9, with the suffix "a" added thereto. The output shaft of the servo motor 112a is connected through a gear train indicated generally at 126 to effect rotation of an adjusting worm 127 which is fixedly secured to a screw 128. The screw 128 is supported for rotation but is held against axial movement by the support 129. The upper end of the screw 128 is threaded into a block 131 which is secured to the cam 122 and which is held against rotation. Thus, when the output shaft of the servo motor 112a is rotated by a signal from the stress-sensitive unit 31, the screw 128 will be rotated and this will effect vertical movement of the cam 122 to thereby adjust the uppermost position of the lower punches 2 within the dies 3.

The dies 3 will be filled, before they travel along the cam 122, with the material to be formed into tablets. The volume of material retained in the dies is determined by the position of cam 122 and the lower punches 2 operating therewith. Accordingly, the output of the feedback circuit will control the volume of material retained in the dies. Scraper 132 slidably engages the upper surface of the table to remove any excess material which is present on the upper surface of the table after the lower punches successively ride upon the cam 122.

While the adjustment of the lower punches 2 as above described will control the volume of material retained in the dies, since the density of the material usually can be maintained substantially constant, such adjustment will also control accurately the weight of material placed in the dies.

Figure 11:
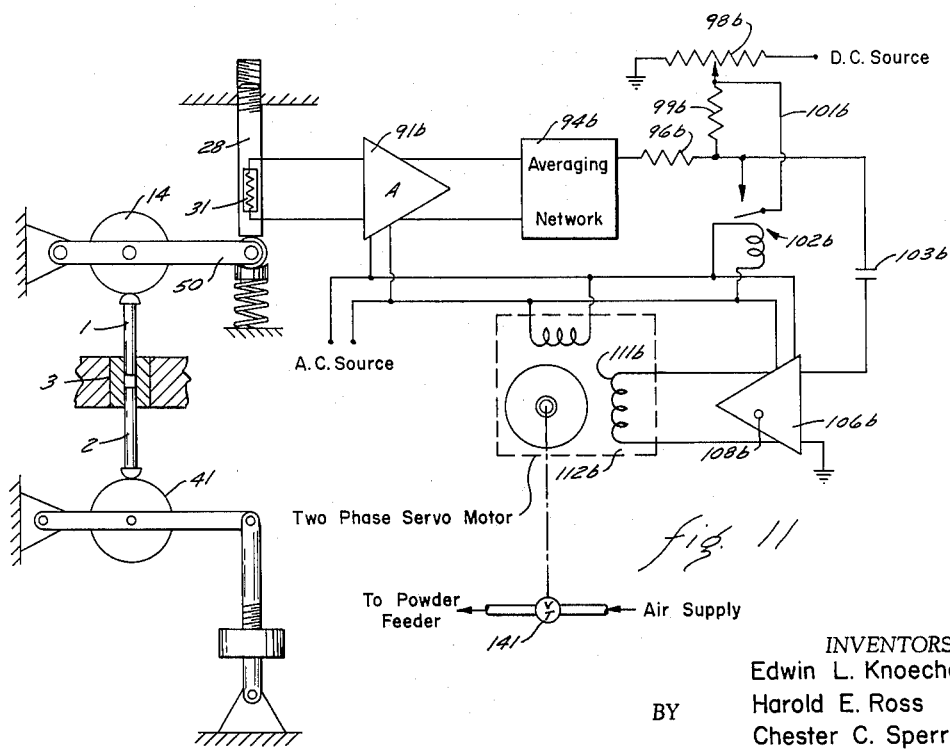
FIGURE 11 is a schematic view similar to FIGURE 9 and showing still another modification.

FIGURE 11 illustrates schematically a system for using the signal from the stress-sensitive unit 31 to control the operation of a mechanical powder feeder. One conventional type of powder feeder is operated by pressurized fluid, such as compressed air. The system of FIGURE 11 provides an adjustable throttle valve 141 for controlling the pressure of the fluid to thereby control the operation of the powder feeder. The throttle valve 141 is controlled by the output shaft of the motor 112b and said motor is operated by a feedback circuit which corresponds to the circuit of FIGURE 9 and the elements of which are identified by the same reference numerals with the suffix "b" applied thereto.

The feedback circuits of FIGURES 10 and 11 preferably operate to average out variations in the punch pressure so that the correction made by moving the cam 122 (FIGURE 10) or by adjusting the valve 141 (FIGURE 11) will be gradual. This is done for the same reasons previously discussed with respect to the FIGURE 9 embodiment and, hence, needs no further detailing.

All of the foregoing discussion has for illustrative convenience assumed the employment of electrical means for sensing the very small movement of a generally stationary part of the tablet machine when same is subjected to a tablet-forming force. Here such movement occurs in the rollers 21 and 22 and is measured by the strain imposed thereby onto the limiting elements 28 and 29.

Although particular preferred embodiments of the invention have been disclosed above for illustrative purposes, it will be understood that variations or modifications which lie within the scope of the appended claims, are fully contemplated.

What is claimed is:

1. In a method of measuring the pattern of force applied to a tablet in a multistation tableting machine, the steps comprising:
   effecting measurement of the very small mechanical movements appearing in an otherwise substantially stationary part of said tableting machine in response to the reaction forces developed in said machine during a tableting operation which movements in turn vary in magnitude in response to the magnitude of force imposed upon said tablet material; and
   deriving signals from the said measurements associated with each tableting station and utilizing same to affect means which are to be maintained in a relationship to said pattern.

2. The method of claim 1 wherein said last-named means determines the quantity of material supplied to the tablet-forming means, whereby the tablet weight is controlled in response to pressures appearing on the tablet-forming dies.

3. The method of claim 1 wherein said last-named means determines the quantity of material supplied to the tablet-forming means, and adjusting successive quantities so supplied to maintain substantially constant pressures on the tablet-forming dies during successive operations, whereby the degree of compaction of successive tablets is maintained substantially constant.

4. In a method of measuring the pattern of force applied to a tablet in a multistation tableting machine, the steps comprising:
   successively creating stresses in a stress-sensitive electrical impedance element which stresses are proportional to stresses successively appearing in a stationary part of a multistation tableting machine which part in turn successively receives stresses changeable solely in response to and in an amount proportional to the forces applied to the tablet material within successively acting tablet-producing means;
   utilizing said changes in impedances of said impedance element resulting from the changes in stress appearing therein to affect an otherwise balanced electrical circuit;
   then utilizing the change in balance relationships of said circuit for controlling an indicator.

5. A tablet-making machine, comprising:
   a plurality of pairs of successively presented tablet-forming punches and mechanical force applying means connectible successively with successively presented pairs of said punches;
   a force-receiving part stationarily mounted on said machine and which is strainable proportionally in response to and at the time of application of force to each successive pair of said punches;
   an electrical impedance element constituting an interpreting element whose conductivity varies with the elongation thereof, said impedance element being related to said force-receiving part for transfer of stress into said impedance element proportional to the change in stress appearing in said force-receiving part upon operation of said machine; and
   interpretative means for visually interpreting the change in electrical conductivity appearing in said element as a result of the operation of said machine.

6. The machine defined in claim 5 wherein said force-receiving part is of elongated, cylindrical shape and said interpretative means includes first, second and third impedances cooperating with said interpreting element to constitute a Wheatstone bridge, the first impedance element being opposite said interpreting element, and being affixed to said force-receiving part substantially diametrically opposite the position of affixing thereto said interpreting element.

7. The machine defined in claim 6 wherein the said second and third impedance elements are also affixed to said force-receiving part adjacent to said interpreting and said first impedance elements but arranged thereon circumferentially with respect to the axis of the direction of elongation of said part when subjected to said force.

8. In a tablet-forming machine having successive pairs of punches successively operable to form a plurality of tablets pressed from particles and including cam-like ejection means for acting against one of each pair of said punches for ejecting a formed tablet from a die with which a given pair of punches operates, said cam-like ejection means being separate from but mounted upon a base, measuring means for measuring the forces developed upon the surface of a tablet in the ejection operation with respect thereto, comprising in combination:
   at least one screw extending through said base and against a surface of said ejection means facing said base and bearing with substantial pressure thereagainst;
   a stress responsive measuring resistance rigidly affixed to said screw for changing its internal stress, and hence its resistance, simultaneously and proportionally with change in longitudinal internal stress of said screw;
   circuitry whose electrical output varies in response to the resistance of said measuring resistance and
   further circuitry for interpreting and visually presenting the electrical output of said circuitry.

9. In a tableting machine having a plurality of pairs of successively presented tablet-forming punches and mechanical force-applying means connectible successively with successively presented pairs of said punches, said force-applying means including a force-transmitting part which is strainable proportionally in response to and at the time of application of force to each successive pair of said punches and controlling means cooperable therewith for controlling the force applied to each successive tablet during the formation thereof, comprising in combination:
   an electrical impedance element constituting an interpreting element whose conductivity varies with the elongation thereof, said impedance element being related to said force-transmitting part for transfer of stress into said impedance element proportional to the change in stress appearing in said force-transmitting part upon operation of said machine;
   an interpretative means responsive to the change in electrical conductivity appearing in said impedance element as a result of the operation of said machine; and
   controlling means responsive to said interpretative means for modifying the force exerted by said force-applying means.

10. The machine defined in claim 9 wherein said interpretative means includes averaging means for averaging a plurality of said changes in electrical conductivity whereby the output thereof will be proportional to the average resulting therefrom.

11. The machine defined in claim 9 wherein the reaction of said controlling means to a change in the output from said interpretative means requires a period of time greater than the period of time required for occurrence of a selected plurality of successive applications of force to successively presented tablet-forming punches whereby the response of said controlling means to any given change in signal from said interpretative means will be averaged over a plurality of successive operations of said tablet-forming punches.

12. In a tablet-forming machine having successive pairs of punches successively operable to form a plurality of tablets pressed from particles and including ejection means for acting against one of each pair of said punches for ejecting a formed tablet from a die with which a given pair of punches operates, said ejection means being mounted on the machine, measuring means for measuring the forces developed upon the surface of a tablet in the ejection operation, the combination comprising:

means secured to the machine and bearing against a surface of said ejection means with substantial pressure;
an electrical impedance element rigidly affixed to said last-named means for creating a change in the electrical impedance of said impedance element proportional to the change in stress appearing in said ejection means upon operation of said machine;
circuitry whose electrical output varies in response to the impedance of said impedance element; and
means connected to said circuitry for responding to a change in the electrical impedance appearing in said impedance element as a result of said operation of said machine.

13. A method of monitoring a multistation tableting machine with respect to forces applied by tablet-forming punch means to tablets successively formed in and ejected from said machine, said machine having strain gage means mounted on a stationary part of said machine, said stationary part being adapted to be strained in response to application of force by said punch means on tablet material during a tablet-forming or ejection operation of the machine, the steps comprising:

successively applying a force to tablet material at a plurality of tableting stations by operation of said punch means and thereby simultaneously altering the strain in said stationary part of said machine during each force-applying step, the alteration of the strain in said stationary part being variable solely in response to the force applied by said punch means to tablet material at each of said plurality of tableting stations;
changing the condition of said strain gage means in response to the alteration of the strain in said stationary part during each successive force-applying step; and
utilizing said change in the condition of said strain gage means to vary an electric circuit of which said strain gage means is a component to provide a signal in response to and having a value indicative of the force applied on the tablet material at each of said plurality of tableting stations by said punch means.

14. A method for monitoring a multistation tableting machine with respect to the forces applied by tablet-forming punch means to tablets successively formed in and ejected from said machine, said machine having electrical impedance means associated with a stationary part of said machine, said stationary part being adapted to be distorted by application of force by said punch means on tablet material during a tablet-forming or ejection operation of the machine, the steps comprising:

successively applying a force to tablet material at a plurality of tableting stations by operation of said punch means and thereby simultaneously distorting said stationary part of said machine during each force-applying step, which distortion is variable solely in response to and in an amount proportional to the force applied by said punch means to tablet material at each of said plurality of tableting stations;
causing a physical distortion to appear in said impedance means in response to and proportional to the distortion appearing in said stationary part during each successive force-applying step; and
utilizing said physical distortion in said impedance means to vary an electric circuit of which said impedance means is a component to provide a signal in response to and having a value proportional to the force applied on the tablet material at each of said plurality of tableting stations by said punch means.

15. In a method for controlling the pattern of forces applied to a tablet in a multistation tableting machine, the steps comprising:

causing a stress to appear in a stress-sensitive electrical impedance element which stress is proportional to the strain in a stationary part of the tableting machine which strain is in turn proportional to the force applied to the tablet material at an individual tableting station;
deriving signals from the changes in the impedance of said impedance element resulting from the forces applied to tablet material at a plurality of said stations, averaging said signals to obtain a resultant signal and utilizing the resultant signal for controlling the force applied to each individual, successively activated station.

16. Apparatus for measuring the forces applied to tablet material in a multiple station tableting machine, comprising:

a frame;
means defining a plurality of tablet-forming cavities arranged in series and mounted for movement with respect to said frame through a closed path;
punch means associated with each cavity for applying pressure to tablet material in said cavities;
mechanical force-applying means connectible successively with successively presented punch means;
a strainable element stationarily mounted on said frame and connected to said force-applying means so that the condition of internal stress of said strainable element changes upon application of force to the tablet material in each of the successively presented cavities by said force-applying means;
strain gage means affixed rigidly to said strainable element so that the condition of said strain gage means changes in response to changes in stress appearing in said strainable element;
an electrical circuit, of which said strain gage means is a component part, for providing a signal in response to and having a value indicative of the forces applied on the tablet material in the respective cavities by the respective punch means.

17. Apparatus for measuring the forces applied to formable material in a multiple station punch machine, comprising:

a strainable element stationarily mounted on said machine and whose condition of internal stress changes upon application of force to said formable material;
an electrical resistance element affixed rigidly to said strainable element for creating a change in the electrical resistance of said resistance element proportional to the change in stress appearing in said strainable element upon operation of said machine;
means for continuously applying a normal stress to said strainable element whereby imposition of force upon said formable material diminishes the stress on said strainable element; and means for visually interpreting the change in electrical resistance in said resistance element as a result of said operation of said machine.

References Cited by the Examiner

UNITED STATES PATENTS

| | | | |
|---|---|---|---|
| 2,422,806 | 6/1947 | Silverman | 73—88.5 |
| 2,455,823 | 12/1948 | Tauber | 73—88.5 X |
| 2,498,881 | 2/1950 | Eldridge | 73—88.5 X |
| 2,547,926 | 4/1951 | Cook | 73—88.5 |
| 2,775,118 | 12/1956 | Legge et al. | 73—88.5 |
| 2,846,723 | 8/1958 | Frank | 107—17 X |
| 2,921,339 | 1/1960 | Pitzer | 107—17 X |
| 2,924,968 | 2/1960 | Colten | 73—88.5 |
| 3,169,394 | 2/1965 | Vosteen et al. | 73—88.5 |

CHARLES A. WILLMUTH, *Primary Examiner.*

JOSEPH D. BEIN, *Examiner.*

JOSEPH SHEA, *Assistant Examiner.*

Disclaimer 3,255,716.—*Edwin L. Knoechel, Harold E. Ross*, and *Chester C. Sperry*, Kalamazoo, Mich. MEASUREMENT OF FORCES WITHIN A TABLETING MACHINE. Disclaimer filed Mar. 29, 1968, by the assignee, *The Upjohn Company*.

Hereby enters this disclaimer to claims 4, 5, 6, 13, 14, and 16 of said patent.
[*Official Gazette July 2, 1968.*]